(12) United States Patent
Halahmi et al.

(10) Patent No.: US 7,039,678 B1
(45) Date of Patent: *May 2, 2006

(54) E-MAIL PROXY

(75) Inventors: Erez Halahmi, Petach Tikva (IL); Eran Fuchs, Kfar Saba (IL)

(73) Assignee: Axis Mobile, Ltd., Tel-Aviv (IL)

( * ) Notice: Subject to any disclaimer, the term of this patent is extended or adjusted under 35 U.S.C. 154(b) by 592 days.

This patent is subject to a terminal disclaimer.

(21) Appl. No.: 09/657,001

(22) Filed: Sep. 7, 2000

(51) Int. Cl.
*G06F 15/16* (2006.01)

(52) U.S. Cl. ............ 709/206; 709/219; 709/203; 455/88; 455/412.1

(58) Field of Classification Search ......... 709/206; 455/412.1
See application file for complete search history.

(56) References Cited

U.S. PATENT DOCUMENTS

| | | | |
|---|---|---|---|
| 5,781,901 A * | 7/1998 | Kuzma | 707/10 |
| 5,895,476 A | 4/1999 | Orr et al. | |
| 5,907,837 A | 5/1999 | Ferrel et al. | |
| 6,011,537 A * | 1/2000 | Slotznick | 345/733 |
| 6,105,055 A * | 8/2000 | Pizano et al. | 709/204 |
| 6,505,236 B1 * | 1/2003 | Pollack | 709/206 |
| 6,574,239 B1 * | 6/2003 | Dowling et al. | 370/469 |
| 6,684,088 B1 * | 1/2004 | Halahmi | 455/566 |

OTHER PUBLICATIONS

Fox et al, "Adapting to Network and Client Variability via On-Demand Dynamic Distillation", ACM Arch. Support for Programming Languages and Operating Systems. Oct. 1996, pp 160-170.

* cited by examiner

*Primary Examiner*—Jeffrey Pwu
(74) *Attorney, Agent, or Firm*—Ohlandt, Greeley, Ruggiero & Perle, L.L.P.

(57) ABSTRACT

A system and method for providing e-mail messages to a user in a more efficient manner. Specifically, the system and method of the present invention enable attachments to be downloaded separately from the text-part of the e-mail message, which requires less bandwidth to download. Instead, these attachments are represented by links in the message which is downloaded to the e-mail client of the user, such that the user can "click on" or otherwise select a link in order to retrieve the attachment. Preferably, the attachment is downloaded to the computational device of the user in a streamed manner.

16 Claims, 4 Drawing Sheets

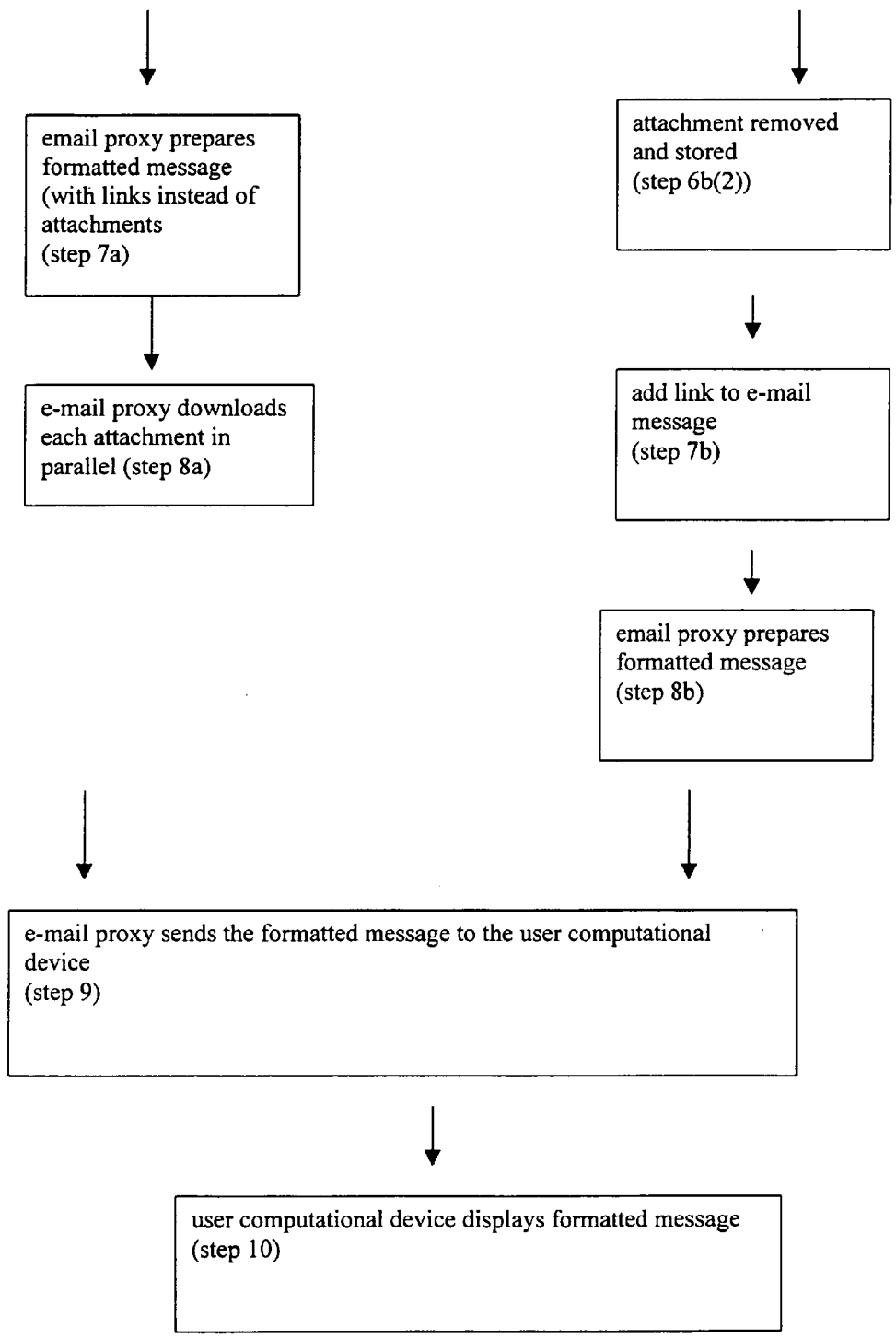
Figure 2 (con't)

Figure 2 (con't)
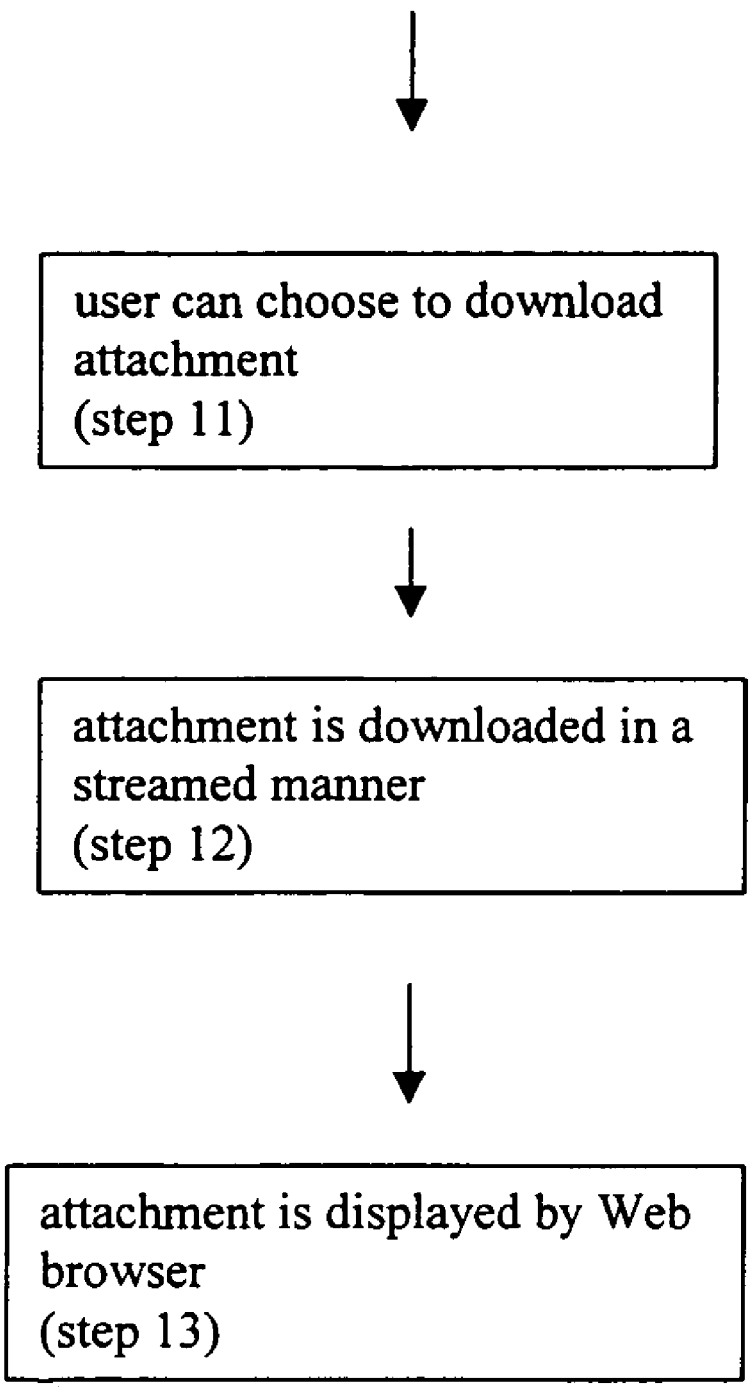

E-MAIL PROXY

FIELD AND BACKGROUND OF THE INVENTION

The present invention is of an e-mail proxy, embodied as a system and a method, for enabling e-mail (electronic mail) messages to be received more quickly and efficiently by the user, and in particular, to such a system and method in which the user is able to separately receive e-mail text messages and attachments, preferably with streaming transmissions which have already been decoded.

Currently, most computer users (hereinafter also referred to as "users") receive e-mail messages through a connection between a computer and an e-mail server. The e-mail server holds the received e-mail messages for the user, and may be installed at an ISP (Internet Service Provider), for example. Such servers usually operate according to the POP3 (Post Office Protocol 3) protocol or alternatively according to the IMAP4 (Internet Message Access Protocol, version 4) protocol. The computer of the user must operate an e-mail client, which is a software program for communicating with the e-mail server in order to download the e-mail messages, and then for displaying these e-mail messages to the user. The e-mail client communicates with the e-mail server according to the POP3 or IMAP4 protocol for receiving e-mail messages, and SMTP (Simple Message Transfer Protocol) for sending (or forwarding) e-mail messages.

The e-mail messages are typically encoded in the standard MIME multi-part message format, which enables the message to optionally also include one or more attachments, for example. Each part of the multi-part message may be separately and differently encoded, for example for plain text messages, as opposed to attached word processing documents, image files, video data, audio data and so forth. Such a multi-part message may be very large because of the size of the attachment(s).

Unfortunately, the e-mail client currently downloads the entire multi-part e-mail message when connected to the e-mail server for receiving messages. Since such a multi-part message may be very large, the process of downloading each message may require a significant period of time. Furthermore, the user cannot view each message with attachment(s) if any, until the entire message has been downloaded. If the computer of the user is connected to the e-mail server through a relatively slow, low bandwidth connection, such as a dial-up modem for example, then this process can be frustratingly slow.

The process is further slowed by the requirement for encoding the attachments in BASE64, in order to prevent the exposure of any control characters in the attachments to any servers which pass the e-mail message through the Internet. The BASE64 encoding method represents every 24 bits of the attachment with 32 bits, thereby increasing the size of the encoded attachments by about one third. Thus, the currently available mechanism for downloading e-mail messages clearly has a number of drawbacks.

An improved solution to this problem would enable the user to review e-mail messages before downloading them, or at least before downloading the complete multi-part message with attachment(s), as text-only e-mail messages are relatively small and quick to download. The user would still be able to download attachments of interest. In addition, the improved solution would provide for a streaming process for downloading e-mail attachments, in order for the user to be able to view the e-mail message as it is being downloaded. Unfortunately, such a solution is not currently available.

There is thus a need for, and it would be useful to have, a system and a method for providing an e-mail proxy, such that user can optionally select particular attachments to download and such that the attachments can be downloaded separately, and which would also optionally and preferably enable the e-mail attachments to be downloaded in a streamed manner, for increased speed and efficiency of downloading.

SUMMARY OF THE INVENTION

The present invention is of a system and method for providing e-mail messages to a user in a more efficient manner. Specifically, the system and method of the present invention enable attachments to be downloaded separately from the body of the e-mail message, which is typically text-only and which therefore requires less bandwidth to download. Instead, these attachments are represented by links in the message which is downloaded to the e-mail client of the user, such that the user can "click on" or otherwise select a link in order to retrieve the attachment. Preferably, the attachment is downloaded to the computational device of the user in a streamed manner, for example according to the HTTP (HyperText Transfer Protocol) protocol.

According to the present invention, there is provided a method for selectively downloading a multi-part e-mail message to an e-mail client operated by a user from an e-mail server, the multi-part e-mail message including an attachment, the method comprising the steps of: (a) retrieving at least attachment information for the multi-part e-mail message from the e-mail server; (b) preparing a formatted message for sending to the e-mail client, the formatted message containing at least a link to the attachment, such that the attachment is not sent to the e-mail client; (c) sending the formatted message to the e-mail client; and (d) displaying the formatted message to the user by the e-mail client.

According to another embodiment of the present invention, there is provided a system for selectively downloading a multi-part e-mail message for a user, the multi-part e-mail message including an attachment, the system comprising: (a) an e-mail server for receiving the multi-part e-mail message; (b) an e-mail proxy in communication with the e-mail server for receiving at least attachment information about the multi-part e-mail message, and for preparing a formatted message containing a link to the attachment; and (c) an e-mail client in communication with the e-mail proxy for receiving the formatted message and for displaying the formatted message to the user, such that the attachment is displayed to the user after the user selects the link.

Hereinafter, the term "network" refers to a connection between any two or more computational devices which permits the transmission of data.

Hereinafter, the term "computational device" includes, but is not limited to, personal computers (PC) having an operating system such as Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers, PDA (personal data assistant) devices, cellular telephones, any type of WAP (wireless application protocol) enabled device, wearable computers of any sort; and any device which can be connected to a network as previously defined and which has an operating system. Hereinafter, the term "Windows™" includes but is not limited to Windows95™, Windows NT™, Windows98™, Windows CE™, Windows2000™, and any upgraded versions of these operating systems by Microsoft Corp. (USA). It is understood that the term "computer", as used herein, may refer to substantially any computational device.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functional steps performed by the method could be described as a plurality of instructions performed by a data processor.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method for providing e-mail messages to a user in a more efficient manner. Specifically, the system and method of the present invention enable attachments to be downloaded separately from the text-part of the e-mail message, which is typically text-only and which therefore requires less time to download. Instead, these attachments are represented by links in the message which is downloaded to the e-mail client of the user, such that the user can "click on" or otherwise select a link in order to retrieve the attachment.

According to a further preferred embodiment of the present invention, the attachment is downloaded to the computational device of the user in a streamed manner. For example, the attachment could be downloaded according to the HTTP protocol, and then displayed by a Web browser which is operated by the computational device of the user. This has the advantage of enabling the user to view the attachment as it is being downloaded, rather than being required to wait for the entire attachment to be downloaded before viewing any part of it. Optionally, the attachment could also be downloaded to the e-mail proxy in the background, as a separate procedure from the downloading of the text-part, or even "on the fly" according to the request of the user, depending upon the e-mail protocol which is used.

The principles and operation of the present invention may be better understood with reference to the drawings and the accompanying description. The present invention is operative with any e-mail protocol, including but not limited to, IMAP4 and POP3 protocols for receiving e-mail messages. The POP3 protocol is explained in RFC1725, while the IMAP4 protocol is explained in RFC2060, both from the Network Working Group, although of course the scope of the present invention is not limited to operation with these protocols.

Figure 1:
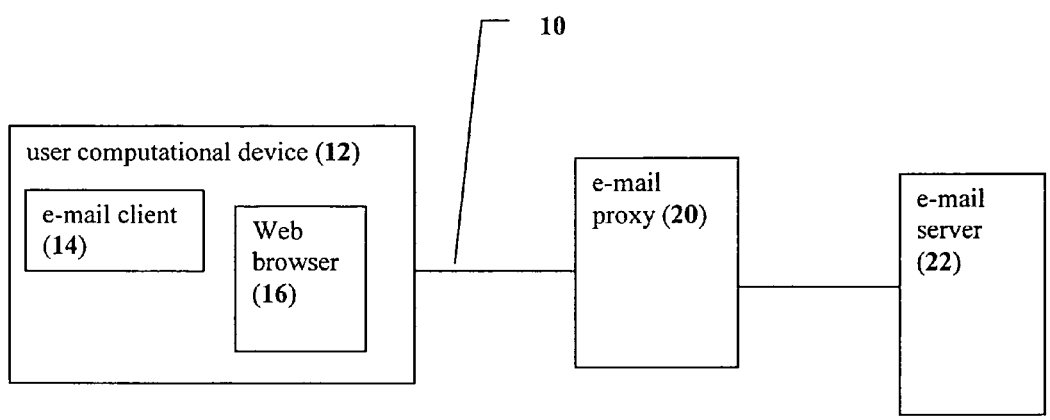
FIG. 1 is a schematic block diagram of an exemplary system according to the present invention.

Referring now to the drawings, FIG. 1 is a schematic block diagram of a system according to the present invention for more rapidly and efficiently retrieving e-mail messages, particularly multi-part messages. A system 10 features a user computational device 12 which operates an e-mail client 14, and optionally also operates a Web browser 16. E-mail client 14 can optionally be implemented as any type of software program which is able to communicate according to standard e-mail messaging protocols, such as POP3 and IMAP4 for example. A non-limiting example of such a software program is the Outlook™ program (Microsoft Corp., USA). The user is able to interact with e-mail client 14 and optionally with Web browser 16. User computational device 12 is connected to a network 18, such as the Internet for example, through which user computational device 12 is in communication with an e-mail proxy 20. E-mail proxy 20, in turn, is in communication with an e-mail server 22.

When the user wishes to retrieve one or more e-mail messages, the user activates e-mail client 14. According to the background art, e-mail client 14 would communicate directly with e-mail server 22. However, according to the present invention, e-mail proxy 20 first communicates with e-mail server 22, in order to retrieve one or more e-mail messages for the user, either in their entirety or as a portion thereof. E-mail proxy 20 then processes these messages, preferably by removing any attachments and storing them if the entirety of the multi-part message is downloaded. Alternatively, if only a portion of the multi-part message is retrieved, preferably the text-part, e-mail proxy 20 then downloads the attachments in the background for storage.

E-mail proxy 20 then preferably substitutes a link to the storage location of the attachment in the e-mail message, and passes this modified e-mail message to e-mail client 14 at user computational device 12. The modified e-mail message is much smaller, and so can be downloaded much more quickly by user computational device 12.

The user may optionally decide to view one of the attachments, at which point the user preferably "clicks on" or otherwise selects the appropriate link in the e-mail message through e-mail client 14. User computational device 12 then downloads the attachment from e-mail proxy 20. More preferably, the attachment is downloaded to user computational device 12 in a streamed manner, such that the user is able to start viewing each portion of the attachment as it arrives at user computational device 12. Optionally, such streamed downloading is achieved by activating Web browser 16, such that the attachment is then downloaded according to the HTTP protocol, and is displayed to the user through Web browser 16. In any case, in order to increase the speed and efficiency of downloading the attachment, the attachment is most preferably decoded, for example from BASE64 encoding, before being downloaded.

Figure 2:
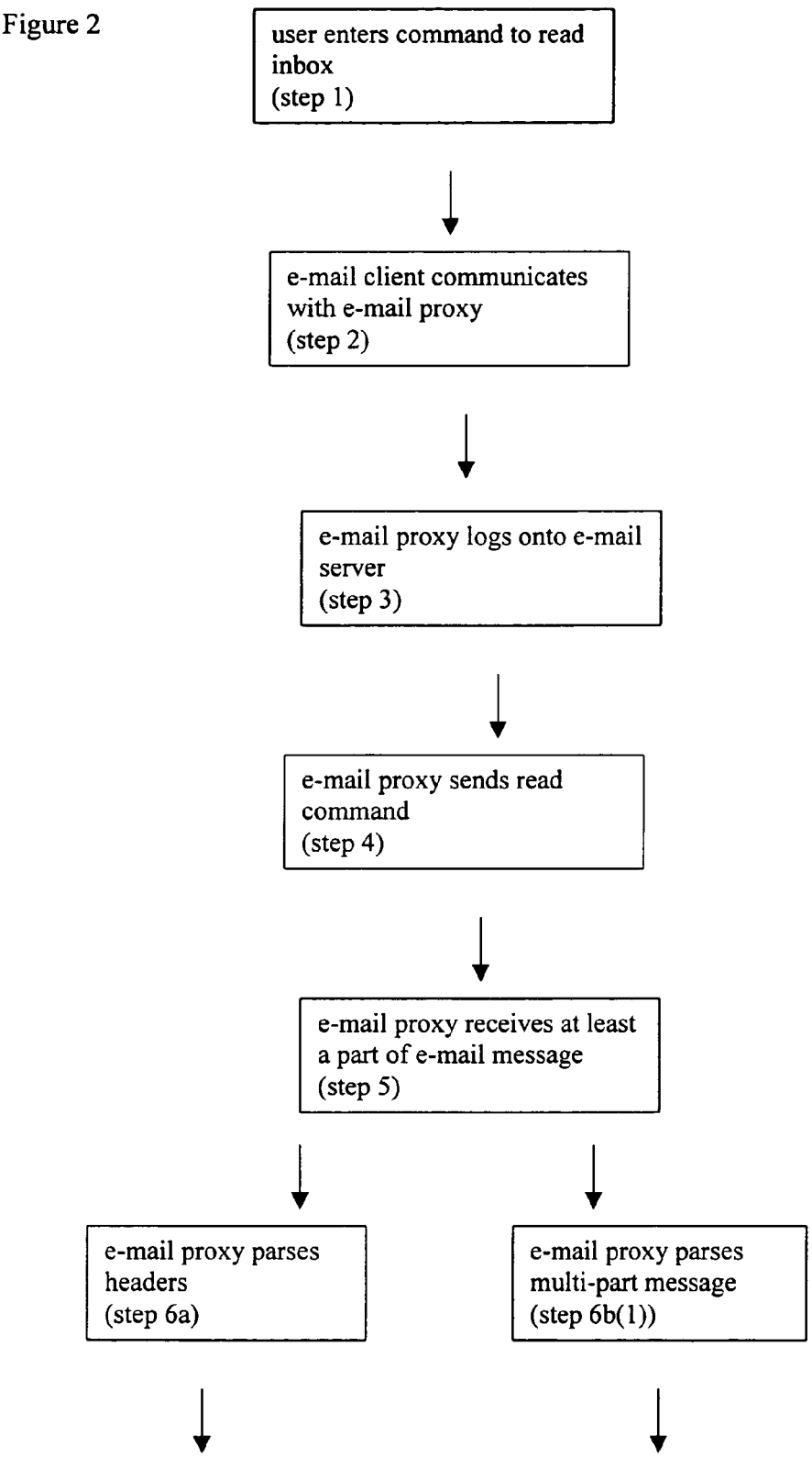
FIG. 2 is a flowchart of an exemplary method according to the present invention.

FIG. 2 is a flowchart of an exemplary method according to the present invention for retrieving an e-mail message, particularly a multi-part e-mail message.

In step 1, the user enters a command to the e-mail client which is operated by the computational device of the user, in order to read the e-mail "inbox" of the user. According to the background art, in step 2, the e-mail client would communicate with a background e-mail server, for example at an ISP through a dial-up modem connection.

According to the present invention, however, in step 2, the e-mail client communicates with an e-mail proxy, described with regard to FIG. 1 above. The e-mail proxy of the present invention communicates with the background art e-mail server in order to receive at least a portion of the multi-part e-mail messages. As explained in greater detail below, according to the POP3 protocol, the complete multi-part e-mail messages, with attachments (if any), are downloaded. Alternatively, according to the IMAP4 protocol, optionally only the header information for the attachments is downloaded, while the attachments themselves are downloaded at a later point (for example, in the background).

The first part of this process occurs in step 3, when the e-mail proxy "logs into", or gains access permission for, the inbox of the user on the e-mail server. According to the POP3 protocol, the process of "logging in" involves the establishment of a TCP connection between the e-mail proxy and the e-mail server, through a handshake procedure (see for example RFC1725 from the Network Working Group for a description of this protocol). Once the connection has been established, the e-mail server sends a greeting to the e-mail proxy, after which commands may be exchanged for retrieving e-mail messages. These commands typically include sending information from the e-mail proxy to the e-mail server for the purposes of authorization, such as a user name for identifying the inbox and a password, as well as transaction commands for actually receiving the e-mail message(s).

The remainder of the method is explained separately with regard to the POP3 protocol and the IMAP4 protocol. IMAP4 has the advantage of supporting commands such as "SEARCH", which enable the e-mail server to return only e-mail messages of interest, such that the e-mail proxy does not need to parse the headers of the e-mail messages in order to determine which e-mail message(s) are of interest. IMAP4 also supports the ability to retrieve only part of the e-mail message directly, with the "FETCH" command. A complex request for part of an attachment can also be sent with the "FETCH" command.

In step 4, if step 3 is successful, the e-mail proxy sends at least one command to the e-mail server to read the inbox of the user. First, the e-mail proxy could send the "STAT" command to determine the total number of message and the total size of these messages. The e-mail proxy then sends the "LIST" command to the e-mail server in order to receive a list of e-mail messages. The received list includes the message identification numbers. The e-mail proxy then downloads the complete multi-part message for the POP3 protocol, but alternatively downloads only the header or headers for the e-mail message(s) by using the "fetch" command for the IMAP4 protocol. More preferably, for the IMAP4 protocol, all of the headers of all of the message-parts for all of the messages are retrieved, such that complete information about all of the messages is obtained, but not the message content.

Step 4, or any part thereof as required, is preferably repeated as necessary such that in step 5, the e-mail proxy receives at least one, but preferably all of the attachments for the e-mail messages which are in the inbox.

Alternatively, the e-mail proxy could download the entirety of each e-mail message, with attachments if any, by sending the "RETR" command to the e-mail server, thereby combining steps 4 and 5 into a single step if all of the e-mail messages are to be retrieved at once, as according to the POP3 protocol.

Regardless of which type of downloading method is preferred, the e-mail proxy preferably provides some type of identification information, in order for the user to be able to determine which e-mail messages are of interest, for example in order to download the attachment(s) of the e-mail message, if any. The method now splits to two branches. For the left branch, which is performed according to the IMAP4 protocol, the attachment information preferably only features certain header information, while the attachment itself is optionally retrieved separately. For the right branch, which is performed according to the POP3 protocol, the entirety of the multi-part e-mail message is retrieved, with the attachment. In either case, more preferably the user is presented with at least a portion of the actual text e-mail message, which is not an attachment.

As shown in the left branch, in step 6a, the e-mail proxy optionally and preferably parses the headers of the message, more preferably according to at least one user preference. For example, the user could request to see only the identity of the sender and the subject of the e-mail message. As described with regard to RFC822 and RFC2045 (Network Working Group), the e-mail message has a predefined structure, such that a multi-part message has a main header, followed by the body. The body itself may have a plurality of headers and bodies for each part of the multi-part message, for example for the text-part, as well as for each attachment. The main header includes fields, which are indicated according to a predefined lexical structure.

In step 7a, the e-mail proxy optionally and preferably prepares a formatted message containing the information of interest to be sent to the user computational device for display to the user. In particular, the formatted message preferably contains the text-part, as well as a link to each attachment which is added to the message in the place of each attachment. This step is preferably repeated until all attachments have been replaced by links in the formatted message.

In parallel, in step 8a, the e-mail proxy optionally and more preferably starts to download each attachment from the e-mail server, most preferably as a background process. Alternatively, the process of downloading each attachment may be performed "on the fly" upon receiving a request from the user, as described in greater detail below. Once the attachment has been received, it is preferably decoded, as described in greater detail below.

Turning now to the right branch, which is performed according to the POP3 protocol, the e-mail proxy receives the entirety of the multi-part e-mail message, including all attachments. In step 6b(1), the e-mail proxy parses the multi-part message to determine the boundaries of each portion. In step 6b(2), when an attachment is found, the header and body of each attachment is removed from the multi-part message, and the attachment itself is stored at a particular location on the e-mail proxy. More preferably, this step also includes the step of decoding each attachment, for example from BASE64 coding.

The actual method applied for decoding the attachment data depends upon the type of encoding method which was used, as described in RFC2045. For example, BASE64 Content-Transfer-Encoding transforms 24-bit groups of input bits into strings of four encoded characters as the output, according to a table given in RFC2045. Decoding reverses the procedure, and takes every four encoded characters for transformation back to the original data according to the correspondence which is given in the table. After decoding, the data is in the original content type, such as text for example.

In step 7b, a short one-link to the storage location on the e-mail proxy is added to the multi-part message, in place of the attachment. Steps 6b(2) and 7b are preferably repeated as necessary in order to replace all such attachments. In step 8b, the formatted message is prepared from the text-only portion of the e-mail message and the links to the location for storing each attachment, which in this case has already been received and stored by the e-mail proxy.

In step 9, the e-mail proxy sends the formatted message to the user computational device, preferably including the text-part of the message with link(s) to any attachment(s).

Optionally and more preferably, the e-mail proxy sends the formatted message to the user computational device in a streamed manner. By "streaming" it is meant that the formatted message is sent without encoding, such that the user computational device can immediately begin to display the formatted message as soon as any portion of it is received. If streaming is used to send the formatted message, then the formatted message is more preferably transmitted according to HTTP (HyperText Transfer Protocol) commands, such that the formatted message is optionally prepared as an HTML (HyperText Mark-up Language) document for example.

In step 10, the user computational device displays the formatted message, after which the user is able to determine which additional information is to be retrieved from the e-mail proxy. If the formatted message contains one or more links to an attachment, then in step 11, the user can choose to download an attachment by "clicking on" the link with a mouse or other pointing device, or otherwise selecting the link.

In step 12, the attachment is preferably downloaded in a streamed manner, optionally and more preferably by activating a Web browser. The Web browser can then download the attachment through HTTP (HyperText Transfer Protocol) streaming. Downloading the attachment in a streamed manner allows the user to view the attachment through the Web browser as the attachment is being downloaded, in step 13. Such a streamed manner is particularly useful for large media files which are designed to be played to the user in a streamed manner, such as video and audio files. Furthermore, the amount of time which is required to download these files is also reduced by first decoding the files, such that the BASE64 encoding is removed from the data, as such encoding tends to add a third of the size of the data, as previously noted.

While the invention has been described with respect to a limited number of embodiments, it will be appreciated that many variations, modifications and other applications of the invention may be made.

The invention claimed is:

1. An e-mail proxy method for enabling an email proxy to support selective downloading of a multi-part e-mail message to an e-mail client operated by a user from an e-mail server, the multi-part e-mail message including at least one attachment, the attachment being encoded, the email proxy communicating between the email server and the email client, the e-mail proxy method comprising at the email proxy:

retrieving information of the at least one attachment for the multi-part e-mail message from the e-mail server;
downloading the at least one attachment of the multi-part email message from the email server;
preparing a formatted message for sending to the e-mail client, the formatted message containing a link to the at least one downloaded attachment, such that the attachment is not sent to the e-mail client;
sending the formatted message to the e-mail client;
decoding the at least one attachment to bring about a reduction in the size of the attachment; and
upon receiving an indication from the email client that the attachment is required sending the decoded requested attachment to the e-mail client.

2. The method of claim 1, wherein said attachment information includes the entirety of the multi-part e-mail message, such that said preparing a formatted message further comprises the separating the multi-part e-mail message into a plurality of portions, including at least a first portion containing the attachment.

3. The method of claim 2, wherein the multi-part e-mail message includes a text part, such that said preparing a formatted message further comprises the separating the multi-part e-mail message into a second portion containing said text-part, and wherein said preparing a formatted message includes adding said second portion to said formatted message.

4. The method of claim 1, wherein said requesting said at least one attachment by said e-mail client further comprises selecting said link by the user from said formatted message.

5. The method of claim 1, wherein said downloading at least one attachment from said email server for viewing by the user is performed in a streamed manner.

6. The method of claim 5, further comprising:
providing a Web browser for interacting with the user; and
displaying said attachment by said Web browser, such that said downloading said attachment is performed according to HTTP.

7. The method of claim 5, wherein said downloading said attachment from said email server includes decoding said attachment.

8. The method of claim 1, wherein said attachment information is a header for the attachment.

9. The method of claim 1, wherein said downloading said attachment from said email server is performed in parallel to said preparing a formatted message.

10. The method of claim 1, wherein said attachment information is a header for the attachment, such that the method further comprises downloading said attachment from proxy to client in a streamed manner for viewing by the user.

11. A system for selectively downloading a multi-part e-mail message for a user, the multi-part e-mail message including at least one attachment, the attachment being encoded, the system comprising:

(a) an e-mail server for receiving the multi-part e-mail message from a sender;
(b) an e-mail proxy in communication with said e-mail server as an e-mail client, for receiving at least attachment information about the multi-part e-mail message and the attachment, and for preparing a formatted message containing a link to the attachment; and
(c) an e-mail client in communication with said e-mail proxy for said email server for receiving said formatted message from said email proxy and for displaying said formatted message to the user, such that the attachment is selectable to be displayed to the user after the user selects said link.

12. The system of claim 11, wherein said e-mail proxy downloads the attachment with said attachment information.

13. The system of claim 11, wherein said e-mail proxy downloads the attachment separately from said attachment information.

14. The system of claim 11, wherein the multi-part e-mail message contains a text part, and said formatted message includes said text-part.

15. The system of claim 11, wherein said e-mail proxy downloads and decodes the attachment before the attachment is sent to said e-mail client.

16. A method for selectively downloading a plurality of portions but not an entirety of a multi-part e-mail message to an e-mail client operated by a user, the downloading being from an e-mail proxy of said multi-part e-mail message received at an e-mail server, the e-mail client being in communication with the e-mail proxy in place of the e-mail server, the method comprising the steps at the e-mail proxy of:

retrieving the multi-part e-mail message from the e-mail server;

separating the multi-part e-mail message into a plurality of portions;

parsing at least one header from said plurality of portions according to at least one user preference;

preparing a formatted message for sending to the e-mail client, said formatted message containing at least information of the plurality of portions but not the entirety of the multi-part e-mail message; and sending the formatted message to the e-mail client, therefrom to allow the e-mail client to selectively access the plurality of portions.

* * * * *